United States Patent [19]

Olsen

[11] 4,371,001
[45] Feb. 1, 1983

[54] CHECK VALVE ASSEMBLY

[75] Inventor: John H. Olsen, Vashon, Wash.

[73] Assignee: Flow Industries, Inc., Kent, Wash.

[21] Appl. No.: 128,553

[22] Filed: Mar. 10, 1980

Related U.S. Application Data

[63] Continuation of Ser. No. 847,105, Oct. 31, 1977, abandoned.

[51] Int. Cl.³ .................... F16K 15/00; F04B 39/10
[52] U.S. Cl. .......................... 137/512.3; 137/527.6; 137/536; 137/540; 417/571
[58] Field of Search .............. 137/512.3, 513.3, 527.4, 137/512, 527, 527.2, 527.6, 527.8, 856, 857, 858, 536, 540; 417/567, 569, 571; 251/361

[56] References Cited

U.S. PATENT DOCUMENTS

| | | | |
|---|---|---|---|
| 625,114 | 5/1899 | MacSpadden | 137/527 X |
| 1,785,313 | 12/1930 | Keener | 137/855 X |
| 2,001,885 | 5/1935 | Ohmart | 137/857 X |
| 2,043,849 | 6/1936 | Bixler | 137/512 |
| 2,048,943 | 7/1936 | Munn | 137/527.4 |
| 2,118,356 | 5/1938 | Money | 137/856 |
| 2,217,380 | 10/1940 | Pedder et al. | 137/855 X |
| 2,296,135 | 9/1942 | Batson et al. | 251/361 |
| 2,353,161 | 7/1944 | Heigis et al. | 137/513.3 |
| 2,725,183 | 11/1955 | Hanson | 137/856 X |
| 3,060,961 | 10/1962 | Conley | 137/527.4 |
| 3,106,169 | 10/1963 | Prosser et al. | 417/567 |
| 3,123,867 | 3/1964 | Combs | 137/857 X |
| 3,260,217 | 7/1966 | Thresher | 417/567 |
| 3,309,013 | 3/1967 | Bauer | 417/567 |
| 3,309,014 | 3/1967 | Bauer et al. | 417/567 |
| 3,526,246 | 9/1970 | Leitgeb | 137/512.3 |
| 3,544,065 | 12/1970 | Mercier | 251/361 X |
| 3,659,967 | 5/1972 | McArthur et al. | 417/397 |
| 4,026,322 | 5/1977 | Thomas | 137/512 |
| 4,098,085 | 7/1978 | McDowell | 137/527 X |

Primary Examiner—Alan Cohan
Assistant Examiner—John A. Rivell
Attorney, Agent, or Firm—Don R. Mollick; David H. Deits; Gregory W. Moravan

[57] ABSTRACT

A check valve assembly adapted for connection to a high pressure reciprocating pump cylinder, comprising valve body means, inlet check valve means and outlet check valve means. The valve body means has an inlet end adapted for connection to the pump cylinder and an outlet end adapted for connection to a high pressure outlet line. The inlet end has a planar surface adapted to be exposed to the interior of the pump cylinder. The valve body means also includes a low pressure inlet passage opening in the planar surface for providing communication with a source of low pressure fluid and a high pressure outlet passage extending between the planar surface and the outlet end. Such passages are parallel to one another and spaced apart a distance at least as great as the radius of the high pressure outlet passage. The inlet check valve means is mounted entirely on the exposed planar surface in association with the inlet passage and prevents high pressure fluid backflow into the inlet passage. The outlet check valve means is associated with the outlet end and prevents fluid backflow from the outlet line. The outlet check valve means includes a valve seating element removable from the valve assembly for servicing thereof, and an outlet valve element moveable to and from a position in which it abuts the seating element and prevents fluid flow into the outlet passage during low pressure fluid flow through the inlet check valve means into the pump cylinder.

12 Claims, 6 Drawing Figures

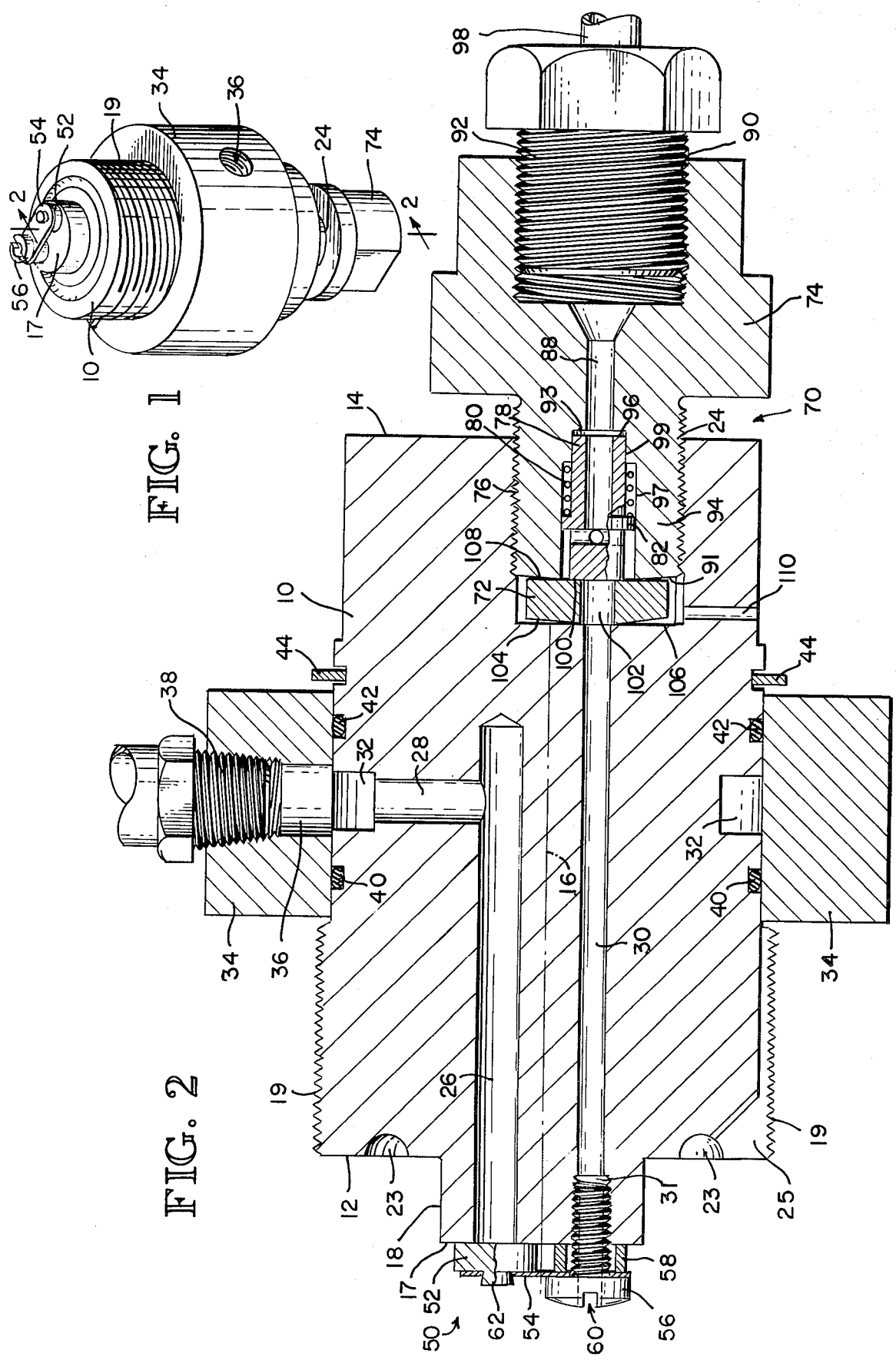

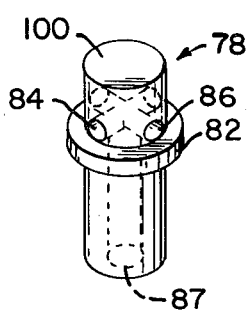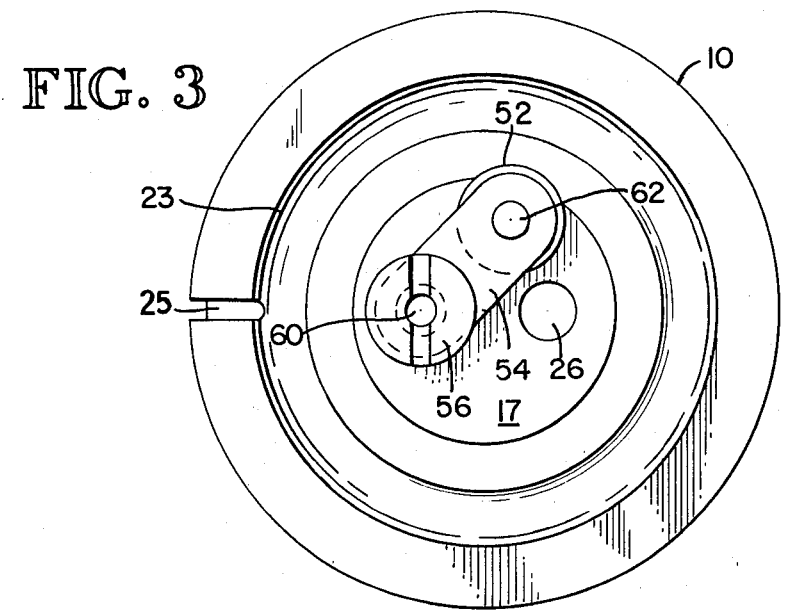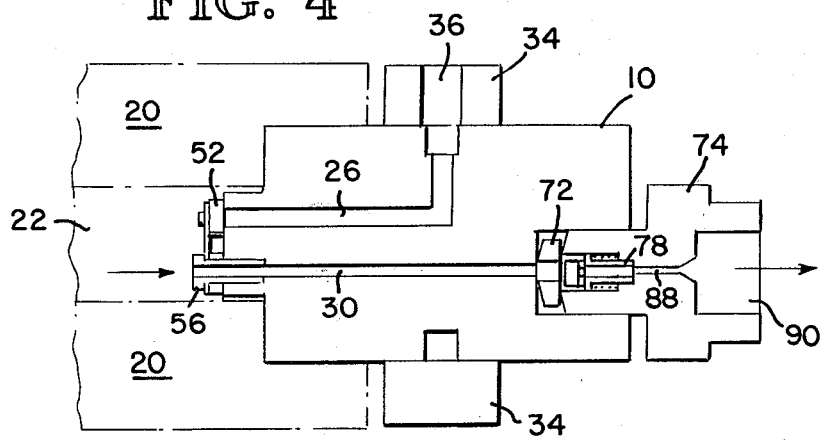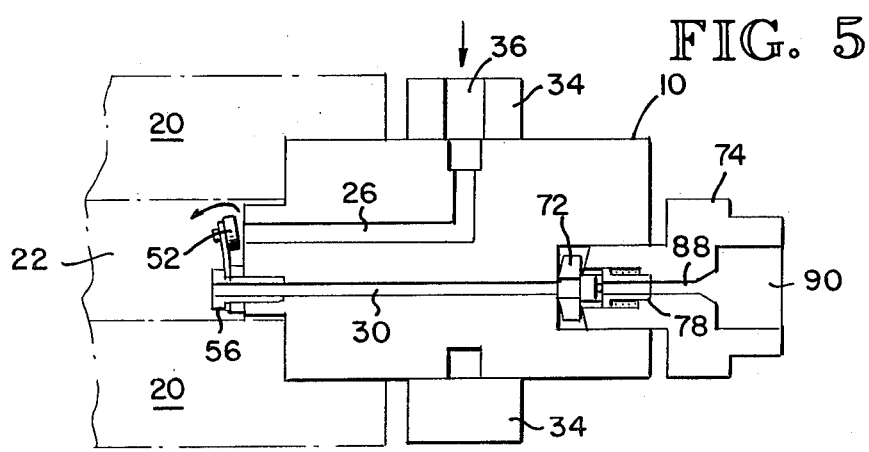

CHECK VALVE ASSEMBLY

This is a continuation, of application Ser. No. 847,105 now abandoned, filed Oct. 31, 1977.

BACKGROUND OF THE INVENTION

This invention relates to check valve assemblies adapted particularly for use with high pressure reciprocating pumps.

A check valve assembly adapted for use with high pressure (e.g. up to 60,000 psi or greater) pumps must be capable of operating at such high pressures without experiencing premature fatigue failure or being subject to excessive wear in connection with its moving parts. Further, because some such wear is inevitable, such check valve assemblies should be adapted for quick and economical repair or replacement of worn parts.

One common check valve assembly comprises a pair of check valves joined in a "T" configuration. This configuration, however, is quite subject to fatigue failure due to stress concentrations at the intersecting bores of the "T". Unwanted stress concentrations have been to a considerable extent avoided by the use of a configuration in which the check valves are coaxial with respect to a high pressure outlet passage. Such a coaxial configuration, however, does not of itself address the problem of wear in connection with the moving check valve elements. The wear problem in high pressure check valves occurs because during each pump stroke, the moveable valve element or poppet is thrust against its seating surface with considerable force, so that both the poppet surface and the seating surface are subject to rapid deterioration. There remains a need for a check valve assembly adapted for easy and economical repair or replacement of such surfaces.

SUMMARY OF THE INVENTION

The present invention provides a check valve assembly comprising novel inlet and outlet check valves having sealing surfaces, i.e. valve elements and their respective seating surfaces, which may be quickly and easily accessed or removed for resurfacing. In one embodiment, all such surfaces are planar, a feature which further facilitates resurfacing and which reduces manufacturing cost. The present invention also provides a novel configuration for inlet and outlet passages which avoids stress concentrations in such passages subject to cyclic pressure fluctuations therein, thus greatly reducing metal fatigue.

The check valve assembly is adapted for connection to a high pressure reciprocating pump cylinder, and comprises valve body means, inlet check valve means and outlet check valve means. The valve body means has an inlet end adapted for connection to the pump cylinder and an outlet end adapted for connection to a high pressure outlet line. The inlet end has a planar surface adapted to be exposed to the interior of the pump cylinder. The valve body means also includes a low pressure inlet passage opening in the planar surface for providing communication with a source of low pressure fluid and a high pressure outlet passage extending between the planar surface and the outlet end. Such passages are parallel to one another and spaced apart a distance at least as great as the radius of the high pressure outlet passage.

The inlet check valve means is mounted entirely on the exposed planar surface in association with the inlet passage and prevents high pressure fluid backflow into the inlet passage. The outlet check valve means is associated with the outlet end and prevents fluid backflow from the outlet line. The outlet check valve means includes a valve seating element removable from the valve assembly for servicing thereof, and an outlet valve element moveable to and from a position in which it abuts the seating element and prevents fluid flow into the outlet passage during low pressure fluid flow through the inlet check valve means into the pump cylinder.

These and other features and advantages of the invention will be apparent from the detailed description and claims to follow taken in conjunction with the accompanying drawings.

BRIEF DESCRIPTION OF THE DRAWINGS

FIG. 1 is a perspective view of the check valve assembly of the present invention;

FIG. 2 is a cross sectional view taken along the line 2—2 in FIG. 1;

FIG. 3 is an end elevational view of the inlet end of the check valve assembly with the inlet valve element swung away to reveal the inlet passage;

FIG. 4 is a schematic cross sectional view of the check valve assembly and pump cylinder during the compression stroke;

FIG. 5 is a schematic cross sectional view of the check valve assembly and pump cylinder during the intake stroke;

FIG. 6 is a perspective view of the outlet valve element of the check valve assembly of the present invention.

DETAILED DESCRIPTION OF THE DRAWINGS

Referring initially to FIG. 2, the check valve assembly of the present invention generally comprises a body 10, an inlet check valve 50 and an outlet check valve 70. Body 10 has a cylindrical external configuration with an inlet end 12, an outlet end 14 and a central axis 16. Inlet end 12 inludes a projecting cylindrical portion 18 disposed centrally about axis 16 and having a planar outer surface 17. Threads 19 are located on the outer surface of body 10 adjacent inlet end 12. By means of such threads, the check valve assembly may be connected to a cylinder 20 (FIGS. 4 and 5) of a reciprocating pump such that the planar surface 17 of projecting portion 18 is exposed to the interior 22 of cylinder 20. Cylinder 20 contains a reciprocating piston not shown in the drawings. Suitable sealing means (not shown) are disposed between projecting portion 18 and cylinder 20. Fluid leaking past such sealing means is collected in cylindrical trough 23 in inlet end 12 and vented therefrom via slot 25 shown in cross section in FIG. 2. Outlet end 14 of body 10 inlcudes a cylindrical recess 24 whose central axis is offset from axis 16. Recess 24 receives and mounts the outlet check valve as hereinafter described in detail.

Body 10 includes low pressure inlet passage 26 and high pressure outlet passage 30 formed therein, inlet passage 26 extending from surface 17 to cross passge 28 and outlet passage 30 extending parallel to the inlet passage from surface 17 to recess 24 in outlet end 14. Cross passage 28 extends radially between inlet passage 26 and a circumferential recess 32 formed on the outer surface of body 10. All internal openings such as passages 26, 28 and recess 30 are spaced away from the outer walls of passage 30 by at least the radius thereof. This feature provides a body 10 which is substantially as resistant to failure due to metal fatigue as a thick walled cylinder. Outlet passage 30 may be formed either directly in body 10, as shown in FIG. 2, or by pressing a hollow tapered cylindrical sleeve into an opening therethrough. In either case, the bore of passage 30 is polished to a high surface finish. Both inlet passage 26 and outlet passage 30 have circular cross sections, the diameter of inlet passage 26 being somewhat greater than that of outlet passage 30. Outlet passage 30 contains an enlarged diameter portion 31 adjacent face 17 for a purpose described below. Such enlarged portion is confined within cylindrical portion 18 in order to receive the benefit of compression by the seal between portion 18 and cylinder 20 and thereby avoid metal fatigue at such enlarged portion.

Cylindrical collar 34 is disposed about body 10 intermediate its ends such that the collar overlies circumferential recess 32. Collar 34 contains passage 36 extending radially therethrough, which passage is adapted to receive inlet fitting 38, the inlet fitting being connected to a source of low pressure fluid. By such means, low pressure inlet fluid may be introduced through passage 36 into recess 32, and from there into inlet passage 26. "O" rings 40, 42 positioned in circumferential grooves on the outer surface of body 10 prevent leakage of the inlet fluid between collar 34 and body 10. Snap ring 44, positioned in a similar groove, prevents the collar from shifting laterally.

The inlet check valve, indicated generally at 50, is positioned entirely on exposed surface 17 of inlet end 12. The inlet check valve comprises an inlet valve element 52 mounted by leaf spring 54 such that the valve element is positioned overlying inlet passage 26. In FIG. 3, the valve element and leaf spring have been swung aside for purposes of illustration to reveal inlet passage 26. Leaf spring 54 is in turn mounted by hollow screw member 56 and spacer 58. Screw member 56 is threaded into enlarged diameter portion 31 of outlet passage 30 and contains an axial opening 60 therethrough such that fluid can pass directly through the screw member into the outlet passage. The shank of screw member 58 passes through hollow cylindrical spacer 58 and through an opening in one end of leaf spring 54, such that the leaf spring and spacer are firmly held between the head of the screw and surface 17 with the leaf spring spaced away from and parallel to such surface.

The inlet valve element 52 is a solid cylindrical member having a diameter greater than that of inlet passage 26 and a thickness equal to that of spacer 58. The outer end of valve element 52 contains a centrally located flared projection 62 which is pressed into an opening in leaf spring 54 at the opposite end thereof from its connection to screw 56. The fit of projection 62 in this opening is such that valve element 52 is capable of a small rocking motion with respect to leaf spring 54. Washers (not shown) may be employed between leaf spring 54 and valve element 52 to help distribute pressure on the valve element for optimum sealing thereof. The inner end of valve element 52 is planar so that it is capable of sealingly abutting planar surface 17 about inlet passage 26.

When the reciprocating pump is on its intake stroke the fluid pressure in the interior 22 of pump cylinder 20 (FIG. 5) drops below the pressure of the low pressure inlet fluid, and valve element 52 is forced away from surface 17 against the force of leaf spring 54. The motion of valve element 52 has been exaggerated in FIG. 5 for clarity. Thus on this stroke the pump freely draws supply fluid through the inlet passage and the inlet check valve into cylinder 20. As the pump changes to its compression stroke (FIG. 4), the pressure in the interior of cylinder 20 rapidly increases to a value considerably in excess of the pressure in the inlet passage, and valve element 52 is forced against surface 17, isolating the inlet passage from the interior of cylinder 20 and preventing backflow of fluid into the inlet passage. The high pressure fluid in such cylinder is thus forced through hollow screw member 56 into outlet passage 30.

The above described check valve of the present invention is entirely located on an exposed outer surface of the valve assembly body, making such check valve extremely accessible and easy to repair or replace. Resurfacing the valve element and the associated portion of surface 17 involves merely removing the valve element by extracting screw member 56 and lapping the sealing surfaces with emery paper against a flat block, a rapid operation that can be carried out in the field with only simple hand tools. The inlet check valve of the present invention further combines a comparatively massive valve element capable of standing up to the high pressure differential during the compression stroke with a comparatively light spring element for optimum performance. An additional feature of the check valve is the slightly loose connection between spring 54 and valve element 52, a feature which helps insure flat sealing despite random irregularities and/or wear in the valve element or in surface 17.

The outlet check valve, generally indicated at 70, is mounted in cylindrical recess 24 of outlet end 14. Recess 24 is positioned so as to be concentric with cylindrical outlet passage 30. The outlet check valve comprises seating element 72, outlet housing 74 and outlet valve element 78. Outlet housing 74 holds seating element 72 between itself and body 10, and also mounts valve element 78 such that the valve element is moveable to and from a position in which it abuts the seating element and prevents backflow of fluid into the outlet passage.

Outlet housing 74 has an irregular cylindrical exterior configuration including a cylindrical projection 94 having a diameter equal to that of recess 24. Projection 94 and recess 24 have matching threads 76 for mounting the outlet housing in recess 24 as shown in FIG. 2. Outlet housing 74 contains a series of cylindrical openings entirely through the outlet housing, such passages consisting of valve chamber 96, connecting passage 88, and mounting recess 90. Valve chamber 96 communicates with outlet passage 30 during the compression stroke of the pump, as hereafter described in detail. Mounting recess 90 is adapted to receive outlet fitting 92 of outlet line 98 for carrying high pressure fluid away from the check valve assembly.

Seating element 72 is a cylindrical disk having a diameter slightly less than the diameter of recess 24, such that the seating element is freely insertable in and removable from such recess. The seating element has planar outer surface 108, a slightly tapered inner surface 104, and a passage 102 extending centrally therethrough. The seating element is tightly held between projection 94 of outlet housing 74 and interior surface 106 of recess 24. When so held, inner surface 104 of valve element 72 sealingly abuts surface 106, and the inner surface 91 of projection 94 sealingly abuts the outer surface 108 of the valve element. Both surface 104 and surface 91 are slightly tapered for improved sealing, the angle of taper being about 5°. Such fluid that does leak past these seals is vented by a passage 110.

Passage 102 of seating element 72 is polished to a high surface finish and has a circular cross section and a diameter slightly greater than that of outlet passage 30. When the seating element is held between projection 94 and surface 106, passage 102 is aligned concentrically with passage 30 and becomes in effect an extension thereof.

Outlet valve element 78 is slidably mounted in valve chamber 96 of outlet housing 74, the valve chamber having a full diameter portion 97 and a reduced diameter portion 99 (FIG. 2). As shown in FIG. 6, valve element 78 has a cylindrical shape of constant diameter except for an enlarged diameter shoulder 82. The diameters of shoulder 82 and the remainder of valve element 78 correspond to those of the full and reduced diameter portions respectively of valve chamber 96. Referring to FIG. 2, rightward or rearward motion of valve element 78 in valve chamber 96 is limited by the rear surface 93 of such valve chamber. Forward, or leftward, motion of valve element 78 is limited by seating element 72. Forward end 100 of the valve element is planar and of a diameter greater than that of passage 102, so that the valve element in its forward position sealingly abuts planar surface 108 of seating element 72. The valve element is biased into such a sealing position by spring 80 extending between shoulder 82 and a shoulder 95 formed in the wall of valve chamber 96.

As best seen in FIG. 6, radial intersecting passages 84, 86 extend through valve element 78 just forward of shoulder 82, such passages communicating with each other and with axial passage 87 extending from such radial passages to the rear surface of the valve element. When the valve element is in its non-sealing position with forward end 100 spaced away from seating element 72, such passages provide a path through which fluid emerging from passage 102 can pass through the valve element and into connecting passage 88.

The operation of the entire check valve assembly may now be described. When the reciprocating pump is on its intake stroke, the fluid pressure in the interior 22 of pump cylinder 20 drops to a low value. As already described, the result is that inlet check valve 50 opens and inlet fluid is drawn into cylinder 20. Since outlet passage 30 and passage 102 communicate directly with the interior of the cylinder, the pressure in these passages is likewise low at this time. The high pressure in outlet line 98 and in connecting passage as therefore cause outlet valve element 78 to be firmly held against seating element 72, preventing backflow of fluid into outlet passage 30 during the intake stroke. When the pump changes to its compression stroke, the inlet check valve closes and the pressure in the outlet passage increases to a value in excess of that in outlet line 98. This pressure difference causes valve element 78 to move away from seating element 72 against the force of spring 80, permitting fluid to flow from passages 30, 102 through the passage in value element 78, through connecting passage 88, and into outlet line 98.

The above described outlet valve is adapted for simple and rapid servicing of seating element 72 and valve element 78. To access these parts, outlet housing 74 is unscrewed from body 10, seating element 72 is withdrawn from recess 24, and valve element 98 withdrawn from valve chamber 96. The flat sealing surfaces 100 and 108 may then be resurfaced simply by lapping with emery paper against a flat block, a quick and easy operation which can be performed in the field with only simple hand tools.

While the preferred embodiment of this invention has been illustrated and described herein, it should be understood that variations will become apparent to one skilled in the art. Accordingly, the invention is not to be limited to the specific embodiment illustrated and described herein and the true scope and spirit of the invention are to be determined by reference to the appended claims.

What is claimed is:

1. A check valve assembly, comprising: a valve body, said valve body having an inlet end and an outlet end, said valve body including inlet means for admitting low-pressure fluid into a pump cavity, and high-pressure outlet means extending between said inlet end and said outlet end for carrying high-pressure fluid therebetween; and an inlet check valve assembly connected to said inlet end, said inlet check valve assembly including an inlet valve seat operatively associated with said inlet means, an inlet valve element operatively associated with said inlet valve seat, a leaf spring having a first end thereof connected to said inlet valve element, and connector means threadedly engaged with said high-pressure outlet means for connecting said leaf spring to said valve body, said connector means having a passage therethrough for permitting high pressure fluid to pass into said high-pressure outlet means to flow from said inlet end to said outlet end, whereby pressurized fluid in said inlet means tends to disengage said inlet valve element from said inlet valve seat to allow low-pressure fluid to flow past said inlet check valve assembly and whereby application of high-pressure fluid from the pump cavity to said inlet valve element engages said inlet valve element with said inlet valve seat to prevent the flow of high pressure fluid into said inlet means.

2. A check valve assembly according to claim 1 including outlet check valve means for preventing fluid backflow from said outlet end into said high-pressure outlet means.

3. A check valve assembly according to claim 1 wherein said inlet valve element is movable relative to said leaf spring to facilitate engagement of said inlet valve element with said inlet valve seat.

4. A check valve according to claim 1 wherein said inlet means includes a cylindrical inlet passage and said high-pressure outlet means includes a cylindrical outlet passage, said cylindrical inlet and said cylindrical outlet passages being parallel and separated by a distance at least as great as the radius of said cylindrical outlet passage to provide resistance to metal fatigue.

5. A check valve assembly according to claim 1 further including projection means for extending a predetermined distance from said inlet end into a high-pressure pump cavity, there being a gap around said projection means such that pressurized fluid in the high-pressure pump cavity surrounds said projection means, said projection means having a surface for mounting said inlet check valve assembly, said inlet means and said outlet means extending through said projection means to said surface, a outlet passage having a threaded portion therein for threadedly engaging said connector means, said threaded portion of said outlet passage extending a predetermined distance from said surface into said projection means, whereby pressurized fluid in said gap and in said outlet passage and said connector means controls the deformation of said threaded portion and said connector means to maintain the structural integrity thereof.

6. A check valve assembly according to claim 2 wherein said outlet check valve means includes an outlet housing demountably coupled to said outlet end, said outlet housing having an outlet valve chamber therein; an outlet valve seating element mounted between said outlet housing and said outlet end; and an outlet valve element movable to and from a position abutting said outlet valve seating element to prevent high-pressure fluid flow from said outlet housing into high-pressure outlet means.

7. A check valve assembly according to claim 6 further including a recess in said outlet end, said high-pressure outlet means providing fluid communication between said inlet end and said recess; and a projection extending from said outlet housing for demountably coupling said outlet housing in said recess to provide access to said outlet valve seating element and said outlet valve element for inspection and servicing thereof.

8. A check valve assembly, comprising:
a valve body, said valve body including an inlet passage therein, a valve seat associated with said inlet passage, and an outlet passage:
a disc-shaped sealing member adjacent said valve seat for sealing said inlet passage to prevent pressurized fluid from flowing into said inlet passage;
a leaf spring having first and second ends, said first end connected to said disc-shaped sealing member; and
connector means connecting said second end of said leaf spring to said valve body, said connector means being threaded into said outlet passage and having a passage therethrough for permitting fluid to pass into said outlet passage, said connector means and said leaf spring cooperating to bias said disc-shaped sealing member against said valve seat for preventing fluid backflow into said inlet passage.

9. A check valve assembly, comprising;
A valve body, said valve body having an inlet end and an outlet end, means for connecting said inlet end to a high-pressure pump cavity, said inlet end having a surface for exposure to the interior of said high-pressure pump cavity, said valve body inlcuding inlet means extending through said surface for admitting low pressure fluid into said high-pressure pump cavity, and high pressure outlet means extending through said surface between said inlet end and said outlet end for carrying high pressure fluid there between;

inlet check valve means for permitting low pressure fluid to flow from said inlet means into said high pressure pump cavity, and for preventing high pressure fluid flow from said high pressure pump cavity into said inlet means, and mounting means connected to said inlet check valve means, and engaging said outlet means including passage means for permitting high pressure fluid to pass there through into said high pressure outlet means; and control means on said inlet end for controlling deformation of said mounting means to maintain the structural integrity thereof, and including projection means for extending a predetermined distance from said inlet end into said high pressure pump cavity, there being a gap around said projection means, such that pressurized fluid in said high pressure pump cavity surround said projection means, said projection means including said surface thereon, said inlet means and said outlet means extending through said projection means to said surface, said mounting means extend a predetermined distance from said surface into said projection means, whereby pressurized fluid in said gap and in said passage controls the deformation of said mounting means to maintain the structural integrity thereof.

10. A check valve assembly according to claim 9 further including a seal in said gap around said projection means for controlling high-pressure fluid leakage around said projection means.

11. A check valve assembly according to claim 9 wherein said inlet check valve means includes: an inlet valve seat operatively associated with said inlet means; an inlet valve element operatively associated with said inlet valve seat; and a leaf spring having first and second ends, said first end being connected to said inlet valve element, said second end being connected to said mounting means, said mounting means being threadedly engaged with said high-pressure outlet means to connect said leaf spring to said valve body, whereby pressurized fluid inside said inlet means tends to disengage said inlet valve element from said inlet valve seat to allow low-pressure fluid to flow past said inlet check valve means into said high-pressure pump cavity, and high-pressure fluid inside said high-pressure pump cavity tends to engage said inlet valve element with said inlet valve seat to prevent the flow of high pressure fluid from said high-pressure pump cavity into said inlet means.

12. A check valve assembly according to claim 11 wherein said leaf spring provides a biasing force to urge said inlet valve element toward said inlet valve seat to prevent high-pressure fluid flow from said high-pressure pump cavity into said inlet means.

* * * * *